March 2, 1926.
A. D. SKINNER
1,574,761
VALVE MECHANISM
Filed Dec. 8, 1920
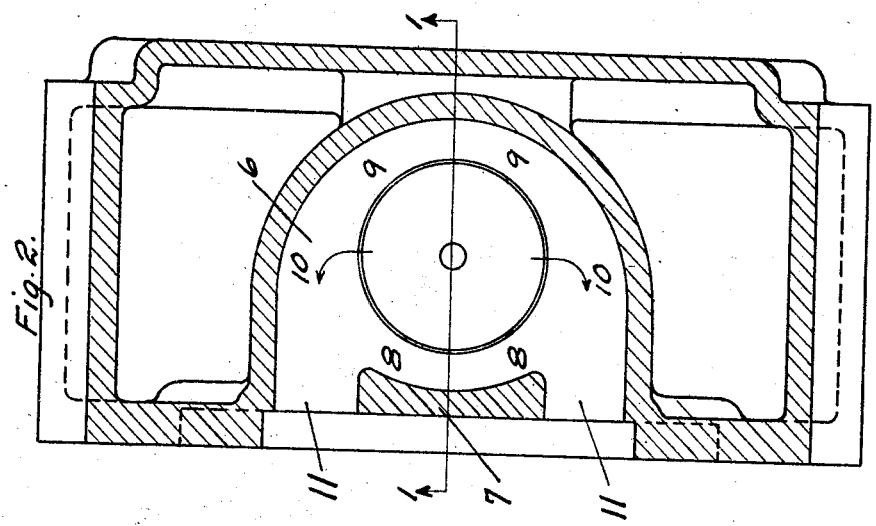
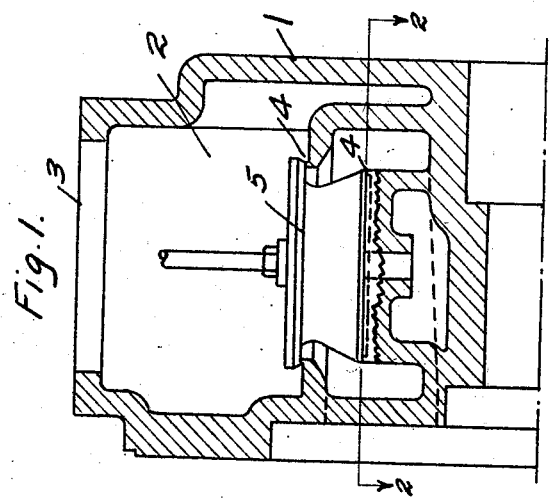
Inventor
Allan D. Skinner
By R. Lord
Attorney Patented Mar. 2, 1926.

1,574,761

UNITED STATES PATENT OFFICE.

ALLAN D. SKINNER, OF ERIE, PENNSYLVANIA, ASSIGNOR TO SKINNER ENGINE COMPANY, OF ERIE, PENNSYLVANIA, A CORPORATION OF PENNSYLVANIA.

VALVE MECHANISM.

Application filed December 8, 1920. Serial No. 429,247.

*To all whom it may concern:*

Be it known that I, ALLAN D. SKINNER, a citizen of the United States, residing at Erie, in the county of Erie and State of Pennsylvania, have invented new and useful Improvements in Valve Mechanism, of which the following is a specification.

This invention is particularly advantageous in connection with steam engines. Heretofore where poppet valves have been used on such engines with lateral ports leading from the valves to the steam engine cylinders these ports have been so designed as to unbalance the pressures on the valve while the steam is flowing past the valve. In consequence the valve has worn sidewise and it has been difficult to maintain a tight joint.

With the present invention the valve mechanism is arranged in a port system which balances the side pressure on the valve. I have illustrated my invention in connection with a steam engine in which the valve is arranged in the head of the cylinder as follows:—

Fig. 1 shows a section of the cylinder head and valve chest on the line 1—1 in Fig. 2.

Fig. 2 a section on the line 2—2 in Fig. 1.

1 marks the cylinder head, 2 the valve chest, 3 the inlet port, 4 the valve seats, and 5 the valve, the valve being of the usual double-ported type. The valve chest has a port 6 leading from the valve laterally into the cylinder. I provide a bridge 7 at the discharge side of the port, the bridge being distanced from the valve so as to provide a port leading to the port 6, the parts 8—8 of this port gradually enlarging from the center to the entrance into the port 6. The parts 8—8 of the port correspond in capacity to the parts 9—9 of the port 6 opposite the valve. The parts 10—10 of the port 6 opposite the valve are of equal dimensions and are gradually expanding from the parts 9—9 discharging through the openings 11—11 at each side of the bridge 7.

With this construction the valve is relieved of lateral thrust and thus side wear on the valve is avoided.

While I have shown this valve as connected with a steam engine and also as mounted in the head of a steam engine I do not wish to be limited to these relations.

What I claim as new is:—

1. In a valve mechanism, the combination of a poppet valve; and a valve chest having a port extending laterally from the axis of the valve and to one side of the valve, said port having a bridge dividing the flow through the port and approximately balancing the side thrust on the valve.

2. In a valve mechanism, the combination of a double-ported poppet valve; and a valve chest having a port extending laterally from the axis of the valve and to one side of the valve, said port having a bridge dividing the flow through the port and approximately balancing the side thrust on the valve.

3. In a valve mechanism, the combination of a double-ported poppet valve; a port extending around and laterally from the valve and to one side of the valve; and a bridge in the port, the passage between the bridge and the valve corresponding to the capacity of the port at the opposite side of the valve.

4. In a valve mechanism, the combination of a double-ported poppet valve; a port leading around and laterally from the valve and to one side of the valve, said port expanding as it extends from the valve; and a bridge across said port and spaced from the valve forming an expanding port leading to the first-mentioned port.

5. In a valve mechanism, the combination of a poppet valve; and a valve chest having a port extending laterally from the axis of the valve and to one side of the valve, said port having a bridge at the side of the valve to which the port leads.

In testimony whereof I have hereunto set my hand.

ALLAN D. SKINNER.